United States Patent [19]

Kobayashi et al.

[11] Patent Number: 4,584,508
[45] Date of Patent: Apr. 22, 1986

[54] RAIN SENSOR IN AN AUTOMATIC WIPER DRIVE CONTROL SYSTEM FOR AN AUTOMOTIVE VEHICLE

[75] Inventors: Kyoji Kobayashi, Chigasaki; Masaru Kato, Hiratsuka; Koichi Fujisawa, Samukawamachi; Yoshinori Nagamine, Fujisawa; Fumio Nakajima, Yokohama, all of Japan

[73] Assignees: Nissan Motor Company, Limited; Jidosha Denki Kogyo Kabushiki Kaisha, both of Yokohama, Japan

[21] Appl. No.: 574,271

[22] Filed: Jan. 26, 1984

[30] Foreign Application Priority Data

Jan. 28, 1983 [JP] Japan .................................. 58-11486

[51] Int. Cl.$^4$ ........................... G01W 1/14; B60S 1/08
[52] U.S. Cl. .................................... 318/483; 318/643; 318/444; 318/DIG. 2; 200/81 R; 307/10 R; 307/118; 73/170 R
[58] Field of Search ................ 318/483, 643, 443, 444, 318/DIG. 2; 200/61.04, 61.05, 81 R; 307/116, 117, 10 R, 118; 73/170 R

[56] References Cited

U.S. PATENT DOCUMENTS

| | | | |
|---|---|---|---|
| 2,944,250 | 7/1960 | Outt | 73/170 R X |
| 3,141,330 | 7/1964 | Murray et al. | 73/170 R |
| 3,264,410 | 8/1966 | Schoenbaum | 381/77 |
| 3,307,407 | 3/1967 | Berg et al. | 73/170 R X |
| 3,555,289 | 1/1971 | Sobkow | 307/10 R |
| 3,786,758 | 1/1974 | Zimmerman | 200/61.04 X |
| 3,830,103 | 8/1974 | Andrjkovics et al. | 73/170 R |
| 3,926,120 | 12/1975 | Williams et al. | 102/210 |
| 4,009,662 | 3/1977 | Riparbelli | 102/264 X |
| 4,010,383 | 3/1977 | Grassmann | 307/118 |
| 4,019,440 | 4/1977 | Strike | 102/207 |
| 4,079,362 | 3/1978 | Grimm et al. | 340/684 |
| 4,239,234 | 12/1980 | Ward | 73/652 X |
| 4,240,518 | 12/1980 | Chelminski | 367/144 X |
| 4,382,408 | 5/1983 | Baumer | 102/216 |
| 4,388,867 | 6/1983 | Baumer | 102/211 |
| 4,389,603 | 6/1983 | Kogawa et al | 318/444 |
| 4,419,646 | 12/1983 | Hermle | 307/116 X |

FOREIGN PATENT DOCUMENTS

| | | | |
|---|---|---|---|
| 77351 | 7/1976 | Australia . | |
| 47-12510 | 4/1972 | Japan | 73/170 R |
| 57-130747 | 8/1982 | Japan | 318/444 |
| 0182422 | 11/1966 | U.S.S.R. | 73/170 R |

OTHER PUBLICATIONS

"Electronic Engineering" vol. 52, No. 638, p. 21, May 1980.

Primary Examiner—William M. Shoop, Jr.
Assistant Examiner—Bentsu Ro
Attorney, Agent, or Firm—Schwartz, Jeffery, Schwaab, Mack, Blumenthal & Evans

[57] ABSTRACT

A rain sensor for an automotive wiper control system detects rain conditions to produce a rain condition indicative signal. The rain sensor includes a vibrator, the outer surface of which is exposed to rain drops and which vibrates or oscillates at an amplitude and frequency corresponding to the energy applied by rain drops. The rain sensor is adapted to produce the rain condition indicative signals corresponding to the vibration amplitude of the vibrator. The vibrator is resiliently suspended within a sensor casing by means of a resilient member which is adapted to allow vibration of the vibrator as rain drops hit the outer surface and to absorb vibrational noises transmitted through the vehicle body. The resilent member simultaneously serves to waterproof the components within the sensor casing.

38 Claims, 15 Drawing Figures

RAIN SENSOR IN AN AUTOMATIC WIPER DRIVE CONTROL SYSTEM FOR AN AUTOMOTIVE VEHICLE

BACKGROUND OF THE INVENTION

The present invention relates generally to a rain sensor for detecting rain conditions on the windshield of an automotive vehicle so that the drive speed of the windshield wipers can be adjusted according to the rain conditions. More specifically, the invention relates to a rain sensor in an automotive wiper speed control system which controls in particular the drive interval in the intermittent mode of a wiper drive system in accordance with rain condition.

A co-pending U.S. patent application, Ser. No. 527,776 filed on Aug. 30, 1983, discloses a Wiper Speed Control System for an Automotive Windshield Wiper, and the same invention has, in turn, been disclosed in the corresponding European patent application No. 83108597.2, filed Aug. 31, 1983. The disclosed windshield wiper speed control system controls the wiper driving speed according to rain conditions around the front windshield. The wiper speed control system includes a rain sensor for detecting rain conditions such as how heavily rain is falling and/or the average size of the individual raindrops. In the present disclosure, including the appended claims, the word "rain condition" is intended to include the meaning of the impact speed of rain drops onto the windshield and/or the rain sensor depending upon vehicle speed.

The rain sensor is positioned near the front windshield, for example, on the cowl top, the engine hood or the like, where rain falls in approximately the same manner as it does at the front windshield. The rain sensor is adapted to detect vibrations due to the impact of rain drops onto the sensor to produce a rain condition signal indicative of the detected rain conditions.

The automotive vehicle has various vibration sources causing vibrations in the vehicle body, such as the engine which creates vibrations as it runs and the suspension mechanism which tends to transmit vibrations from the road wheels to the vehicle body. Due to such vehicle body vibrations, the rain sensor may be spuriously vibrated or oscillated to produce noise in the rain condition signal which may obscure the rain condition information. Therefore, it is essential to provide a noise-free rain sensor which can satisfactorily and successfully avoid the influences of vehicle body vibrations.

SUMMARY OF THE INVENTION

Therefore, it is an object of the present invention to provide a rain sensor which can satisfactorily and successfully avoid the influences of vehicle body vibrations and ensure detection of rain conditions.

Another and more specific object of the invention is to provide a rain sensor which can accurately detect rain conditions near the front windshield for allowing precise wiper speed control by a wiper speed control system.

Another object of the present invention is to provide a rain sensor with a waterproof housing which allows electrical components to be installed as close as possible to their signal sources.

To accomplish the aforementioned and other objects of the present invention, a rain sensor according to the present invention is provided with a vibrator plate elastically suspended within a sensor housing with an outer surface exposed to rain. A sensor element such as piezoelectric element is attached to the vibrator plate to detect vibrations of the latter to produce the rain condition signals representative of the frequency and amplitude of each vibration.

In the preferred embodiment, an elastic member is provided for suspending the vibrator plate within the sensor housing. The elastic member is fixed to the circumferential edge of the vibrator plate by way of the heat-welding process known as vulcanization and is also fixed to the sensor housing by vulcanization. Further, a seal member is provided for the sensor housing for waterproofing the sensor housing so that electrical sensor circuitry including an amplifier for amplifying the rain condition signal level can be housed within the sensor housing.

According to one aspect of the invention, there is provided a rain sensor for detecting rain conditions and producing a rain condition indicative signal which varies according to detected rain conditions, which comprises a sensor housing, a vibrator suspended within the sensor housing and having a sensor surface exposed to rain drops, the vibrator vibrating at an amplitude and frequency corresponding to the energy applied to the sensor surface by the impact of rain drops to produce the rain condition indicative signal corresponding to the vibrations, and a resilient member resiliently supporting the vibrator within the sensor housing while allowing vibration of the vibrator when rain drops impinge upon the sensor surface.

According to another aspect, a rain sensor for an automotive wiper control system according to the invention, comprises an essentially hollow sensor casing adapted to be fixed to a vehicle body at a point at which rain falls in approximately the same manner as it does at a front windshield, a vibrator plate vibratingly suspended within the sensor casing and having a sensor surface exposed from the sensor casing for receiving rain drops thereon, the vibrator plate adapted to vibrate at amplitude corresponding energy applied to the sensor surface by collison of rain drops, a vibration sensitive element associated with the vibrator plate for vibration therewith, the vibration sensitive element producing an electric signal having a value representative of the amplitude of vibration of the vibrator plate, a resilient suspension member fitted onto the sensor casing and the vibrator plate for resiliently suspending the vibrator plate with the vibration sensitive element for vibration in response to collision of rain drops, and a sensor circuit housed within the sensor casing and adapted to output a rain condition indicative signal having a value which varies with the variation of signal value produced by the vibration sensitive element.

BRIEF DESCRIPTION OF THE DRAWINGS

The present invention will be understood more fully from the detailed description given hereafter and from the accompanying drawings of the preferred embodiments of the invention, which, however, should not be taken to limit the invention to the specific embodiments but are for explanation and understanding only.

In the drawings:

FIG. 2 is a plan view of the first embodiment of rain sensor of FIG. 4;

DESCRIPTION OF THE PREFERRED EMBODIMENTS

Figure 1:
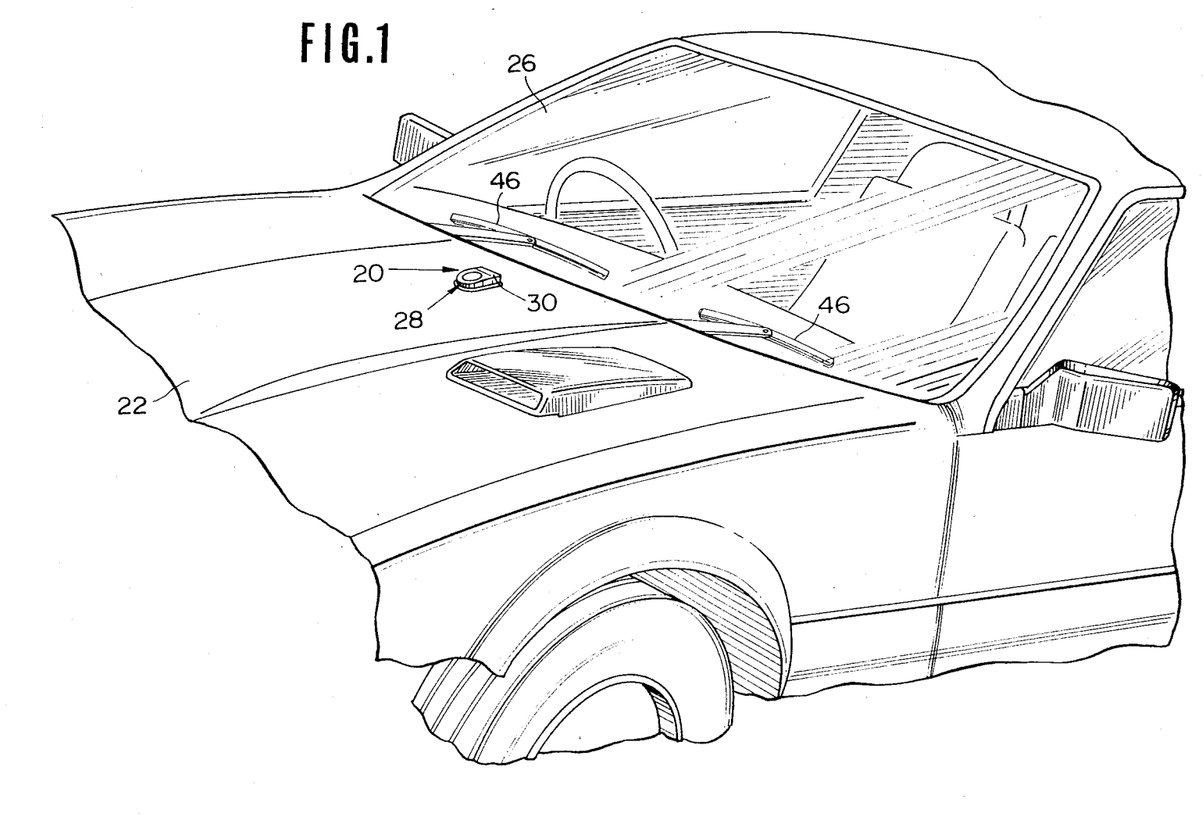
FIG. 1 is a perspective view of an automotive vehicle on which the preferred embodiment of a rain sensor according to the present invention is mounted.
Figure 2:
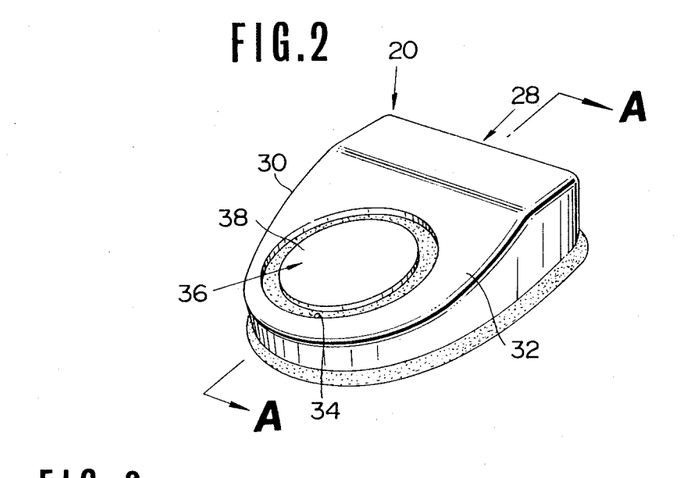
FIG. 2 is an enlarged perspective view of the preferred embodiment of the rain sensor of FIG. 1.

Referring now to the drawings, particularly to FIGS. 1 and 2, a rain sensor 20 is generally mounted on the engine hood 22 or the cowl top panel near the front windshield 26 in order to detect rain conditions around the windshield. A sensor casing, which is generally represented by the reference numeral "28", has an upper cover member 30. The upper cover member 30 has the upper surface 32 tilted or inclined downwardly towards its front end. The tilt angle of the upper surface 32 of the upper cover member 30 is preferably in the range of about 5° to 25°, which has been experimentarily obtained to maximize sensitivity to rain conditions. A generally circular opening 34 is formed in the upper cover member 30 so that the upper surface 38 of a vibrator, which is generally represented by the reference numeral "36", can be exposed to the atmosphere. The vibrator 36 is elastically suspended from the sensor casing 28 in order to be able to vibrate when rain drops impinge thereupon. The vibrator 36 is adapted to produce a vibration indicative signal having value which varies in dependence upon the amplitude and frequency of vibration which, in turn, depends upon the force of impact of rain drops onto the vibrator.

Figure 3:
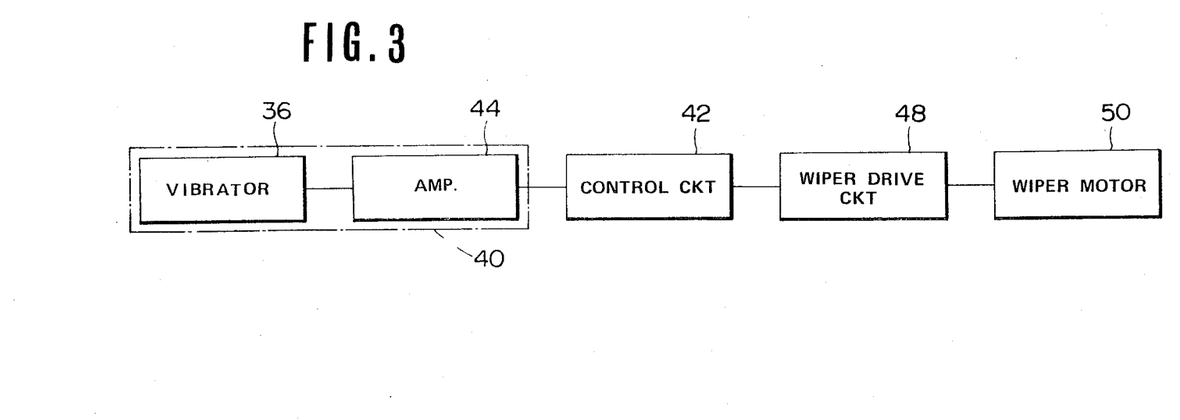
FIG. 3 is a schematic block diagram of a wiper speed control system to which the preferred embodiment of the rain sensor according to the present invention is applied.

The vibrator 36 is associated with a sensor circuit, schematically illustrated in FIG. 3, which is generally represented by the reference numeral "40". This wiper drive control circuit has been disclosed in the aforementioned U.S. Pat. Ser. No. 527,776 corresponding to European patent application No. 83108597.2. The disclosure of the aforementioned copending Patent Applications is hereby incorporated by reference.

In summary, the vibration indicative signal produced by the vibrator 36 is fed to a control circuit 42 via an amplifier 44 which is adapted to amplify the vibration indicative signal level sufficiently for application to the control circuit. The control circuit processes the amplified vibration indicative signal to derive the operational timing of a front windshield wiper 46 in accordance with detected rain conditions. In the shown embodiment, the control circuit 42 determines the intervals between intermittent operation of the wiper 46 while operating in its INTERMITTENT mode. However, it would also be possible to control the wiper operation by varying the wiper speed according to rain conditions detected even when the wiper is operated in its LOW-speed mode and/or HIGH-speed mode.

In the case of controlling the intermittent-operation interval, the control circuit 42 outputs a driver signal whenever a summed or counted vibration indicative signal value becomes equal to or greater than a predetermined value. A driver circuit 48 is connected to the control circuit 42 to receive the driver signal to actuate a wiper motor 50 for one cycle of wiper operation each time the driver signal is received.

Figure 4:
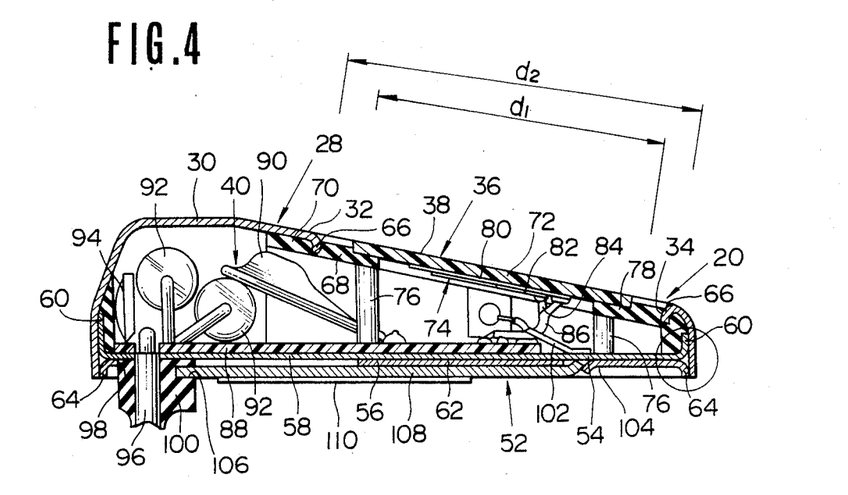
FIG. 4 is a longitudinal section of the first embodiment of the rain sensor taken along line A—A in FIG. 2.

FIG. 4 shows the detailed structure of the first embodiment of the rain sensor according to the present invention. The upper cover member 30 of the sensor casing engages a lower base member which is generally represented by the reference numeral "52" to form a waterproof sensor casing. The lower base member 52 comprises a first base 54 and a second base 56. The first base 54 is adapted to support the sensor circuit including the amplifier 44 and the control circuit 42. The first base 54 has a horizontal major section 58 and a circumferential flange 60 which turns upwards from the circumferential edge of the major section. The second base 56 also has a horizontal major section 62 mating with the lower surface of the major section 58 of the first base 54, and a circumferential flange 64 bent downwards from the circumferential edge of the major section. The mating surfaces of the first and second bases 54 and 56 are bonded together.

The upper cover member 30 is formed with a downwardly or inwardly bent flange 66 extending along the circumferential edge of the opening 34. An elastic rubber 68 is fitted to the lower or inner surface 70 of the upper cover member 30 around the circular opening 34. The elastic rubber is fixed to the mating surface by way of vulcanization and engages the flange 66. The elastic rubber also engages the flange 60 of the first base 54 to establish a waterproof seal therebetween.

Figure 5:
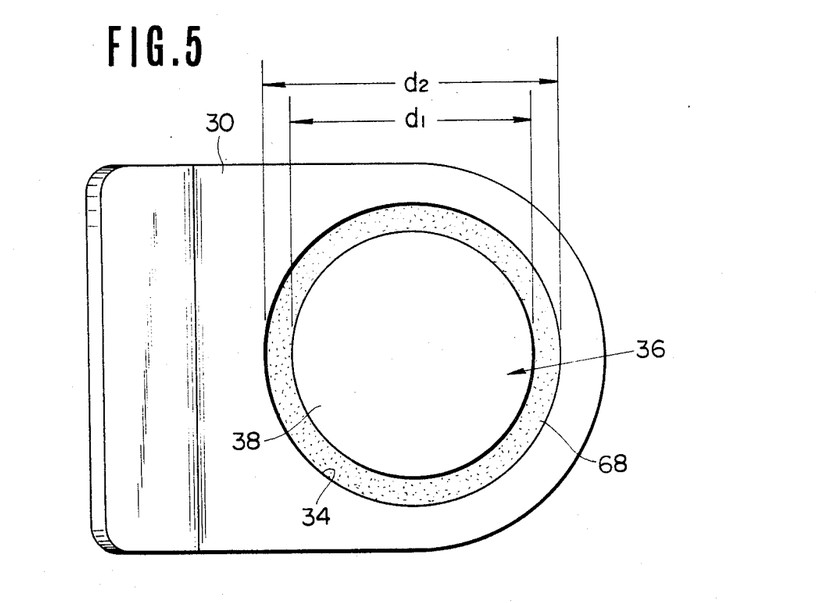

As shown in FIGS. 4 and 5, the vibrator 36 comprises a vibration plate 72 in the form of a circular disc and a vibration detector member 74 secured to the lower surface of the vibration plate. The vibration plate 72 has a smaller diameter $d_1$ than that ($d_2$) of the circular opening 34 in the upper cover member 30. The circumferential edge of the vibration plate 72 is fixedly secured to the elastic rubber 68 by way of vulcanization so that it remains free to vibrate or oscillate in response to collison of rain drops onto the exposed surface 38. A number of elastic supports 76, which may be made of rubber or the like, extend from the upper surface of the major section 58 of the first base 54. The elastic supports are located opposite the circumferential edge of the vibration plate 72 where the latter is vulcanized to the circumferential edge 78 of the elastic rubber 68. The elastic supports 76 are adapted to restrict the vibration of the vibration plate 72 in order to define a resonating frequency of the vibrator 36 suitable for detecting rain conditions and to avoid the influence of vehicle body vibrations in cooperation with the elastic rubber. The elastic supports 76 are further intended to act as a stopper to restrict the travel of the vibrator 36 in response to external forces on its exposed surface. This satisfactorily and successfully prevents the elastic rubber around the vulcanized portion from being damaged by excessive movement of the vibration plate in response to external forces applied thereto. The elastic supports 76 are secured to the first base 54 by way of vulcanization or bonding to extend to the vibrator 36 from the first base.

Figure 6:
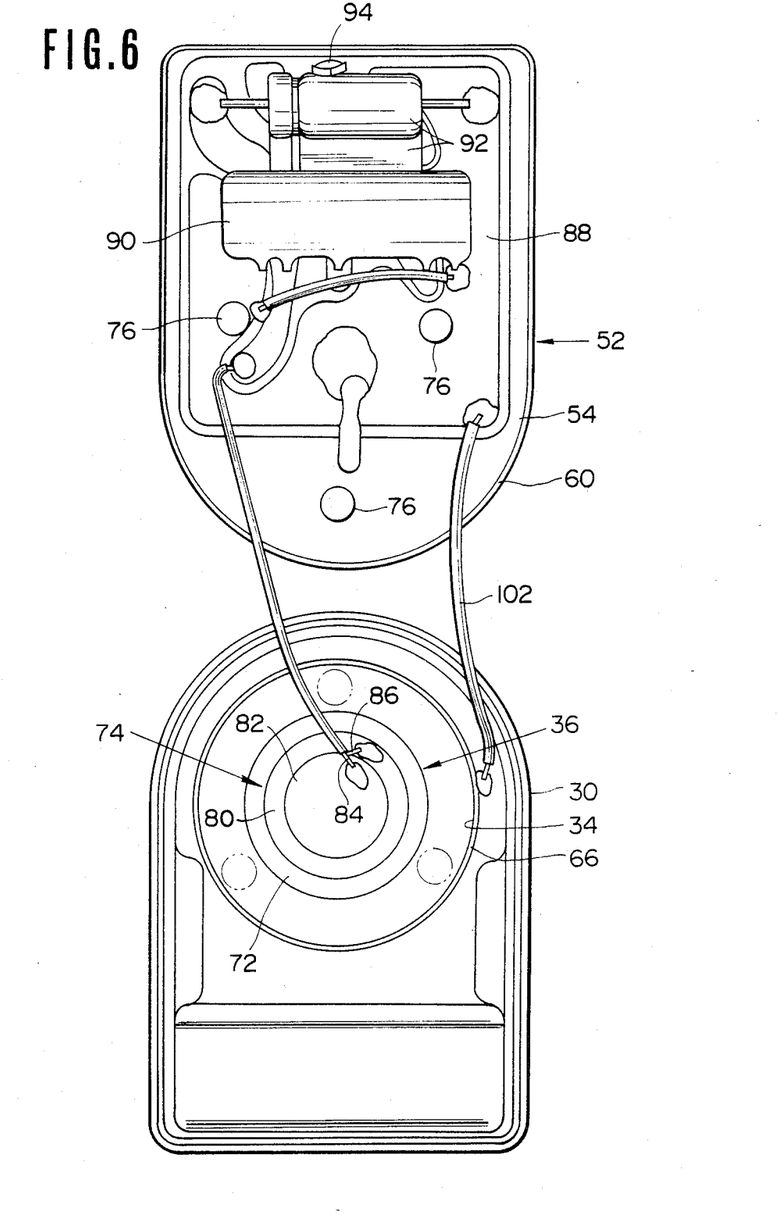
FIG. 6 is a plan view of the first embodiment of the rain sensor of FIG. 4 with the upper sensor housing laid open.
Figure 7:
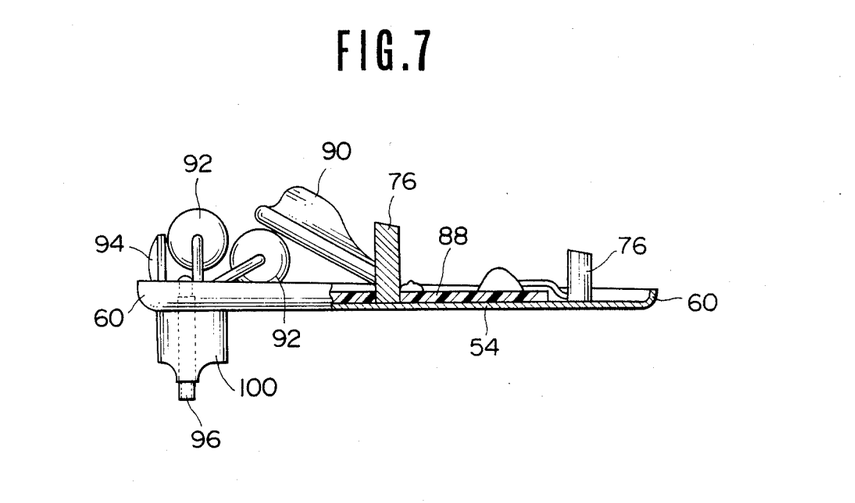
FIG. 7 is a cut-away side view of a first base plate supporting a sensor circuit.

As shown in FIGS. 4 and 6, the vibration detector member 74 is attached or bonded to the lower surface of the vibration plate 72 and comprises an electrically conductive plate 80 in intimate contact with the lower surface of the vibration plate 72, and a piezoelectric element 82 attached to the conductive plate 80. The piezoelectric element 82 is bonded to the lower surface of the conductive plate 80 by means of an appropriate glue or adhesive. The conductive plate 80 and the piezoelectric element 82 are connected to the sensor circuit 40 to supply the vibration indicative signal produced in response to vibrations due to collision of rain drops on the exposed surface 38 of the vibration plate 72, via conductive wires 84 and 86 respectively.

The sensor circuit 40 comprises a plated printed circuit board 88 with an integrated circuit 90, capacitors 92, a resistor 94, and so forth. The plated printed circuit board, the integrated circuit 90, the capacitors 92, the resistor 94, and so forth also form the amplifier 44. The control circuit 42 is also housed in the sensor casing 28. The control circuit 42 in the sensor casing 28 is connected to the driver circuit 48 provided with the driver motor 50 outside of the sensor casing by means of a conductive wire 96. The conductive wire 96 extends through an opening 98 formed in the second base 56 and through an rubber grommet 100.

In the preferred embodiment, the upper cover member 30 and the lower base member 52 are made of electrically conductive materials and are connected to each other by means of a conductive wire 102. In this way, the sensor casing 28 as an assembly is grounded to the vehicle body to eliminate the external or background noises to the sensor.

As shown in FIG. 4, the second base 56 is formed with a downwardly bent strip portion 104 along its inner circumferential edge. In addition, the grommet 100 is formed with a recess 106 in its outer periphery. A fitting bracket 108 with adhesive tape 110 stuck to its lower surface is simultaneously engageable with the strip portion 104 and the recess 106 of the grommet 100. The fitting bracket 108 is fixedly secured to the appropriate portion of the engine hood or cowl top panel by the adhesive tape 110. Thus, by engagement of the strip portion 104 and the recess 106 of the grommet with the fixing bracket 108, the sensor casing 28 is releasably secured to the engine hood or the cowl top panel.

It should be appreciated that although the shown embodiment has three elastic supports arranged to elastically support the vibrator and restrict its downward movement, the number of elastic supports and the shape of each elastic support and not limited to those of the shown embodiment. Furthermore, although the elastic supports in the shown embodiment are in constant contact with the vibrator to elastically support the latter in co-operation with the elastic rubber, it would be possible to position the top of the elastic support opposite and slightly separated from the lower surface of the vibrator. In this case, the elastic supports would serve only as stoppers for the vibrator to restrict its downward movement.

Figure 8:
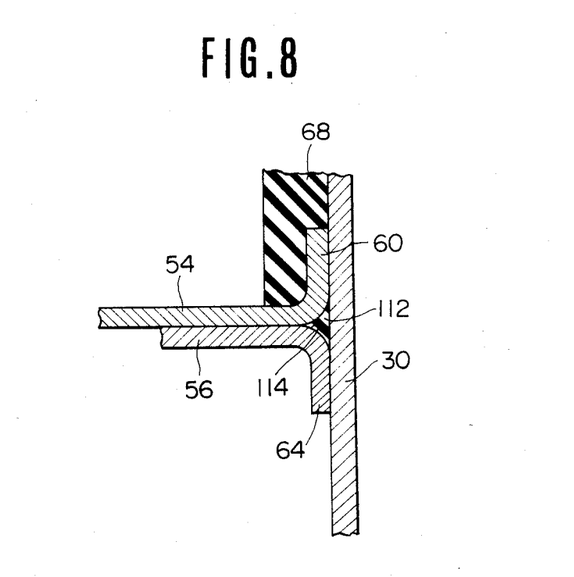
FIG. 8 is an enlarged section of the portion of the sensor housing of the rain sensor encircled in FIG. 4.

In the preferred structure, a sealer 112 is provided in a space 114 defined between the first and second bases 54 and 56, as shown in FIG. 8. This sealer 112 acts to establish a waterproof seal between first and second bases and the internal periphery of the upper cover member, and between the first and second bases themselves.

The rain sensor 20 constructed as set forth above can be released from the engine hood or the cowl top panel to which it is fixed by disengaging the fixing bracket from the strip portion of the second base and the recess of the grommet. In this case, the fixing bracket will remain on the engine hood or the cowl top panel so that the sensor casing may again be installed.

In the rain sensor operation, since the vibrator 36 is elastically supported by the elastic rubber, the vibrations transmitted through the vehicle body to the sensor casing can be satisfactorily and successfully absorbed by the elastic rubber. Therefore, even when the vehicle body vibrates or oscillates due to engine vibrations, road shocks transmitted through the suspension mechanism, shocks generated when the door are opened or closed, and so forth, the vibrator will vibrate only when rain drops hit or impinge on the exposed surface thereof with adequate force. Therefore, the vibration indicative signal will have a value accurately corresponding to rain conditions. As a result, the wiper intermittent operation control will exactly correspond to rain conditions.

Figure 9:
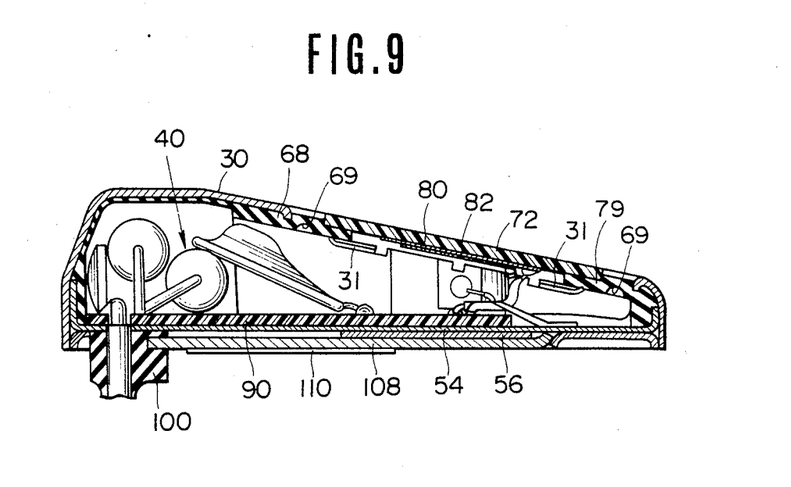
FIG. 9 is a section similar to FIG. 4 of a modification of the first embodiment of rain sensor of FIG. 4.
Figure 10:
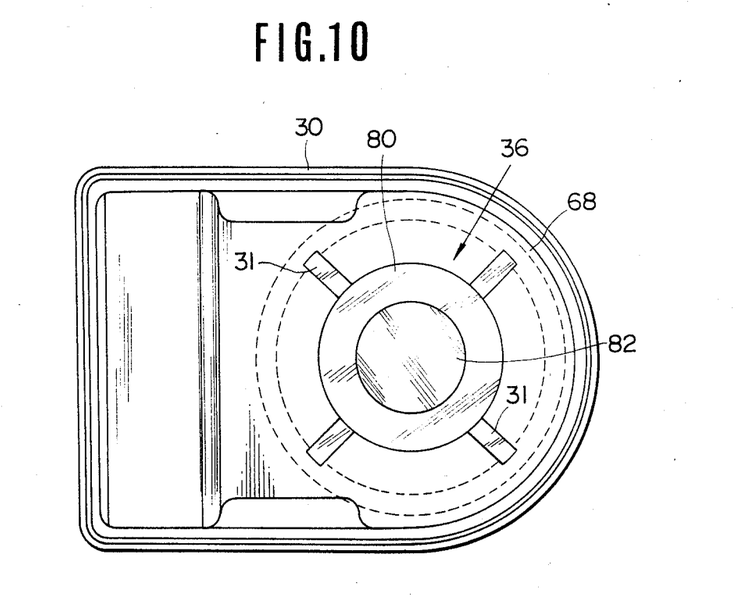
FIG. 10 is a bottom view of the upper sensor housing of the modification of FIG. 8.

FIGS. 9 and 10 show a modification of the aforementioned first embodiment of the rain sensor. In this embodiment, the elastic rubber 68 is formed with a groove 69 opposite the circumferential edge of the circular opening 34. This groove 69 serves to ensure that the elastic rubber will be sufficiently flexible to absorb vibrations transmitted through the vehicle body. On the other hand, the upper cover member 30 is provided with four extensions 31 extending radially toward the center of the circular opening 34. The extensions 31 are positioned below the vibrator 36 with a given vertical clearance. The extensions 31 acts as a stopper to limit the downward travel of the vibrator when downward pressure is applied to the latter. These extentions may be regarded as a substitute for the elastic supports of the aforementioned first embodiment.

According to this modification, since the elastic rubber 68 is ensured of adequate flexibility by the groove 69, the magnitude of vibrations due to collision of rain drops onto the vibrator will be greater than in the aforementioned first embodiment. This results in improved sensitivity of the rain sensor.

The second embodiment of the rain sensor according to the present invention is illustrated in FIGS. 11 to 15. In this second embodiment, a sensor casing 202 comprises an upper cover member 204 and a lower base member 206, as in the aforementioned first embodiment. An elastic rubber 208 is vulcanized onto the inner or lower surface of the upper cover member 204 and is also vulcanized onto the lower surface of a vibration plate 210 which constitutes a vibrator 212 together with an electrically conductive plate 214 and a piezoelectric element 216. The elastic rubber 208 thus elastically supports the vibrator 212, so that the vibrator 212 will be free to vibrate or oscillate in response to the energy of collision or impact of rain drops onto the exposed upper or outer surface 218 of the vibration plate. As in the aforementioned embodiment of FIGS. 9 and 10, the elastic rubber 208 is formed with a groove 220 extending along the circumferential edge of a circular opening 222. This groove 220 serves to add flexibility to the elastic rubber to ensure that it will satisfactorily absorb vibrations transmitted through the vehicle body and to amplify the magnitude of vibrator vibrations to a sufficient level.

Figure 11:
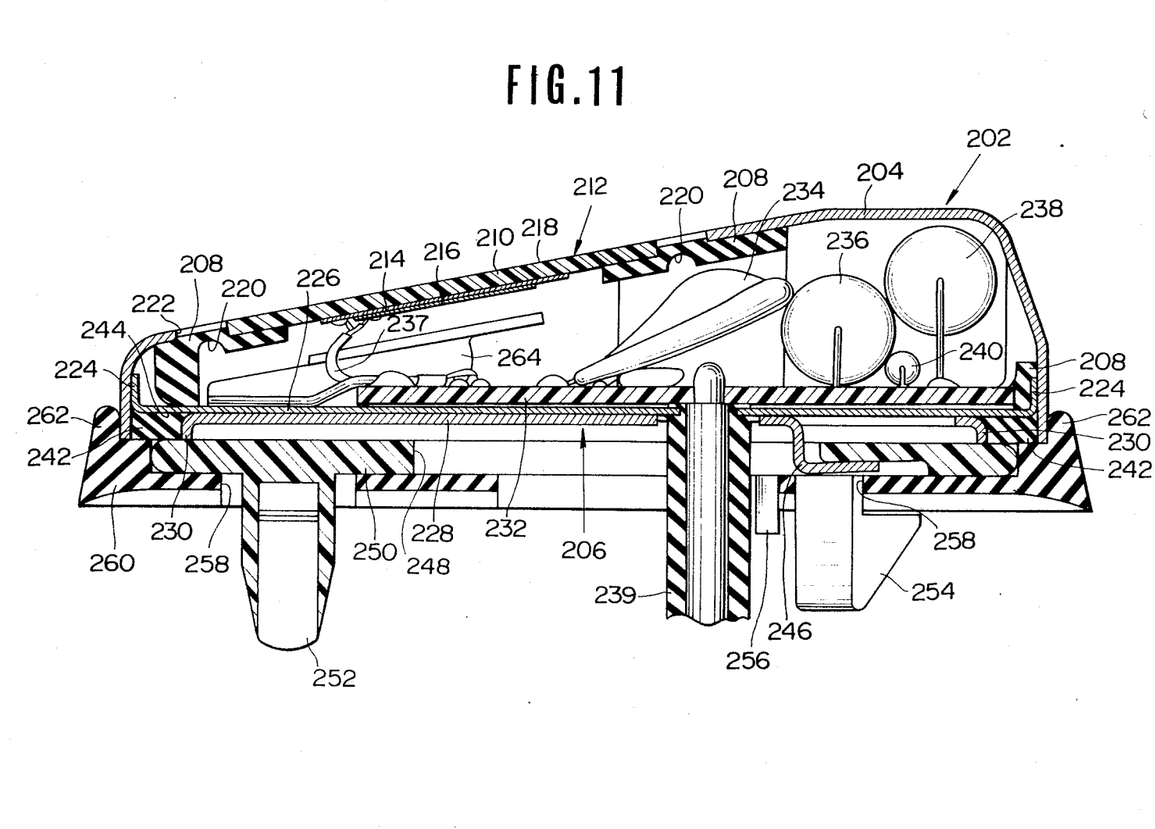
FIG. 11 is a longitudinal section of the second embodiment of the rain sensor of FIG. 2, taken along line A—A of FIG. 2.
Figure 12:
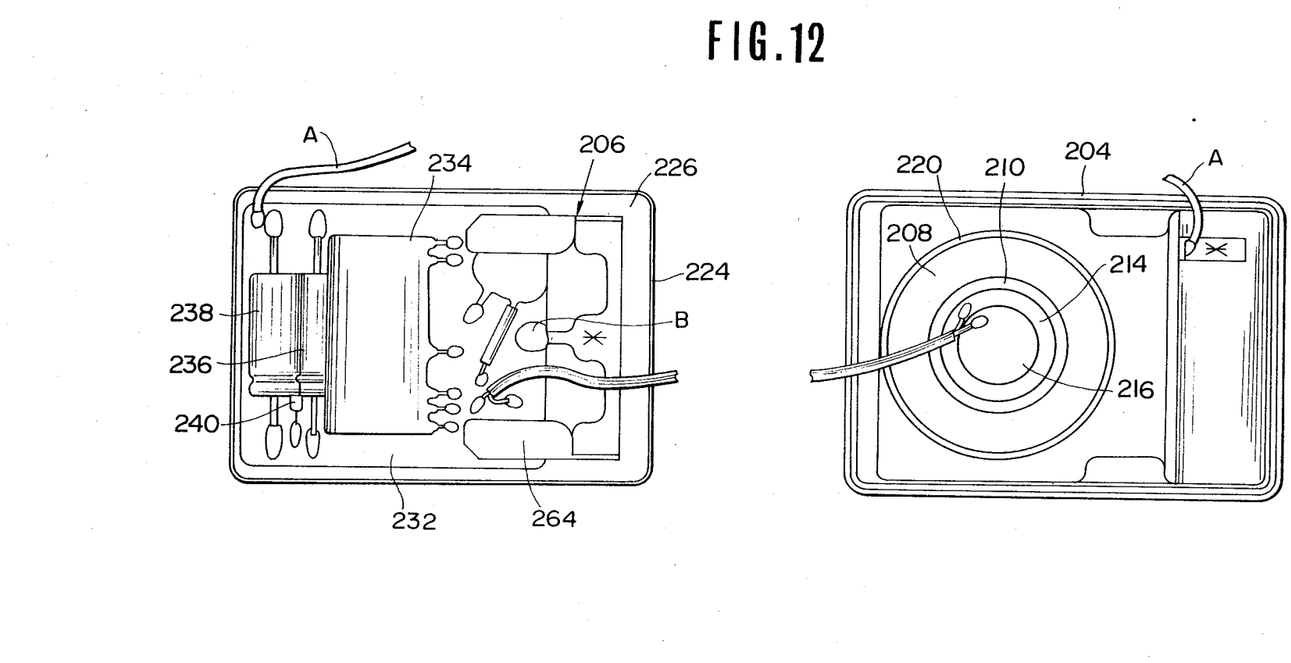
FIG. 12 is a view similar to FIG. 6 of the rain sensor of FIG. 11, in which upper part and lower part have been separated and the upper part has been turned upside-down.
Figure 13:
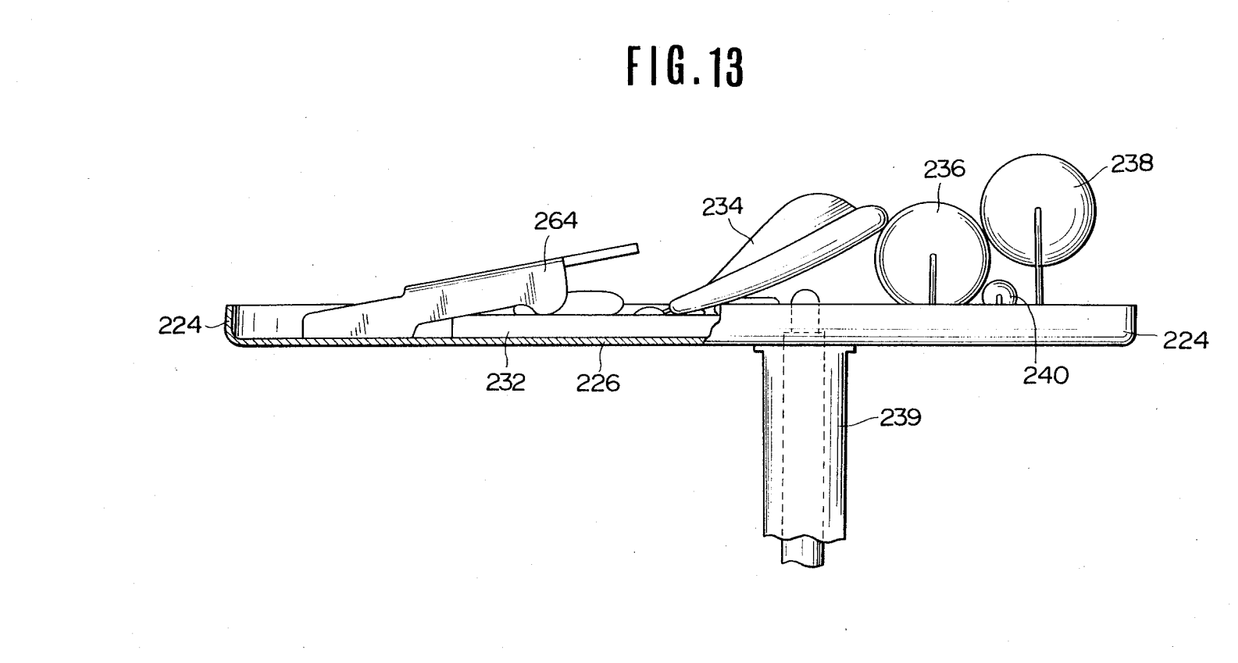
FIG. 13 is a side elevation of the first base plate, similar to FIG. 7.
Figure 14:
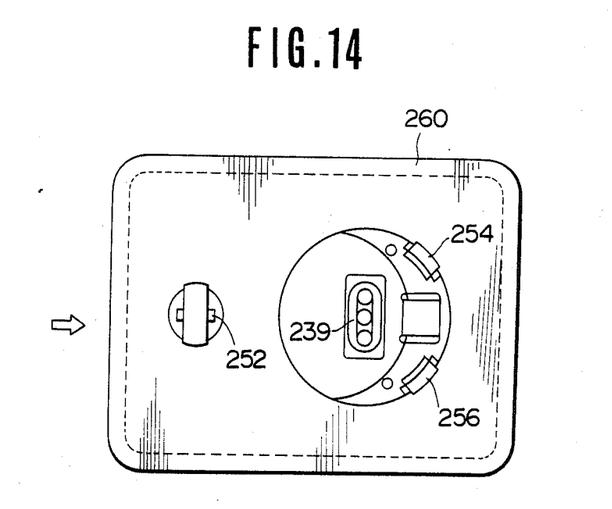
FIG. 14 is a bottom view of a second base plate in the sensor housing.
Figure 15:
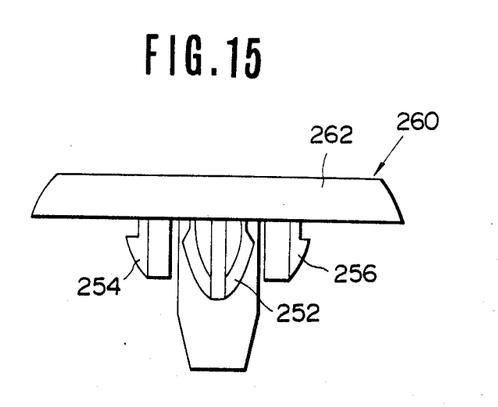
FIG. 15 is a front elevation of the second base plate of FIG. 14.

The upper cover member 204 is engageable in waterproof fashion to the lower base member 206. The waterproof connection is established by the elastic rubber 208 engaging the upwardly bent flange 224 of a first base 226. A second base 228 with downwardly bent flange 230 is fixedly attached to the lower surface of the first base 226 by means of an appropriate adhesive. The first base 226 supports a plated printed circuit board 232 which includes an integrated circuit 234, capacitors 236 and 238, a resistor 240, and so forth. The integrated circuit 234, the capacitors 236 and 238 and the resistor 240 constitute the amplifier 44 of FIG. 3. The plated printed circuit board 232 also includes the control circuit 42 of FIG. 3 which produces the driver signal based on the detected rain conditions.

The conductive plate 214 and the piezoelectric element 216 are connected to the amplifier 44 through an electrically conductive wire 237. In addition, the controller 46 is connected to the wiper driver circuit 48 via an electrically conductive wire which extends through an elastic grommet 239. The upper cover member 204 is connected to the print board 232 via a lead A and the base 206 is connected to the printed circuit board 232 via a conductive welding B, and a grounding wire (not shown) connected to the print board 232 and passing through the grommet 239 to external ground. With this arrangement, the upper cover member and the lower base member are grounded to eliminate external and/or background noise in the rain sensor.

A sealer 242 fills in the space 244 defined by the first and second bases 226 and 228 and the upper cover member 204. This sealer 242 ensures that the sensor casing will be waterproof and thus protects the internal circuitry in the sensor casing.

As best shown in FIG. 11, the second base has a bent hook portion 246 engageable with an opening 248 formed in a fastener plate 250. The fastener plate 250 is provided with three hooks 252, 254, and 256 extending downwards from its lower surface. Each hook 252, 254 and 256 of the fastener plate 250 extends through a corresponding through opening 258 formed in a rubber mat 260 with a circumferential, upwardly-extending wall 262. The hooks 252, 254 and 256 are adapted to resiliently engage the vehicle body in order to secure the sensor casing 202 to the rubber mat 260 and so to the vehicle body. Alternatively, the rubber mat 260 may be elastically attached to the engine hood or cowl top panel to establish water-tight engagement therebetween. The peripheral wall 262 of the rubber mat 260 is adapted to snugly fit the outer periphery of the upper cover member 204 in order to establish a waterproof seal therebetween.

The first base 226 is bent upwards along its lateral edges to form upward extensions 264 which serve as a stopper for the vibrator to restrict its downward movement. The upper end of the upper extensions 264 are accordingly positioned a given distance below the vibration plate 210. As in the aforementioned first embodiment, the extension 264 may prolong the life of the elastic rubber by preventing excessive downward movement of the vibrator even when relatively strong external forces are applied thereto.

As set forth above, according to the present invention, the rain sensor can produce a rain condition indicative signal exactly corresponding to detected rain conditions, and can satisfactorily and successfully eliminate the influences of external noise such as vehicle body vibrations.

If necessary, the vibration plate can be formed in an appropriate shape or thickness to have a resonating frequency outside of the possible vibration range of the vehicle body vibrations, engine vibrations, road shocks, and so forth.

While the present invention has been described in detail in terms of the specific embodiments, it should not be limited to those specific embodiments but can be modified and/or embodied in other ways while still performing the sought operations and achieving the required advantages. Therefore, the invention should be understood or interpreted to include all of the possible modifications and/or embodiments which fall within the scope of the appended claims.

What is claimed is:

1. A rain sensor for detecting rain conditions to produce a rain condition indicative signal which varies according to detected rain conditions, comprising:
   a sensor housing;
   a vibrator suspended within said sensor housing and having a sensor surface exposed to the atmosphere so as to be accessible to rain drops, said vibrator being adapted to vibrate at an amplitude corresponding to the energy applied to said sensor surface by the impact of rain drops to produce said rain condition indicative signal having an amplitude corresponding to said vibration amplitude; and
   a resilient member fixed to the outer periphery of said vibrator and resiliently supporting said vibrator within said sensor housing for facilitating vibration of said vibrator when rain drops impinge upon said sensor surface.

2. A rain sensor for detecting rain conditions to produce a rain condition indicative signal which varies according to detected rain conditions, comprising:
   a sensor housing;
   a vibrator suspended within said sensor housing and having a sensor surface exposed to the atmosphere so as to be accessible to rain drops, said vibrator being adapted to vibrate at an amplitude corresponding to the energy applied to said sensor surface by the impact of rain drops to produce said rain condition indicative signal having an amplitude corresponding to said vibration amplitude; and
   a resilient member resiliently supporting said vibrator within said sensor housing for facilitating vibration of said vibrator when rain drops impinge upon said sensor surface, said resilient member being fixed to said sensor housing by means of vulcanization.

3. A rain sensor for detecting rain conditions to produce a rain condition indicative signal which varies according to detected rain conditions, comprising:
   a sensor housing:
   a vibrator suspended within said sensor housing and having a sensor surface exposed to the atmosphere so as to be accessible to rain drops, said vibrator being adapted to vibrate at an amplitude corresponding to the energy applied to said sensor surface by the impact of rain drops to produce said rain condition indicative signal having an amplitude corresponding to said vibration amplitude; and a resilient member resiliently supporting said vibrator within said sensor housing for facilitating vibration of said vibrator when rain drops impinge upon said sensor surface, said resilient member being fixed to said vibrator by means of vulcanization.

4. The rain sensor as set forth in claim 1, wherein said resilient member is fixed to said sensor housing by means of vulcanization, and is fixed to the circumference of said vibrator by means of vulcanization.

5. The rain sensor as set forth in claim 4, wherein said resilient member has a portion configured to be more flexible than the remaining portion, said flexible portion extending along the circumference of said vibrator and serving to support the vibration of said vibrator.

6. The rain sensor as set forth in claim 1, which further comprises a stopper means provided opposite said vibrator for restricting the movement of said vibrator.

7. The rain sensor as set forth in claim 6, wherein said stopper means normally remains in contact with the surface of said vibrator opposite said sensor surface and is resiliently deformable to allow vibration of said vibrator in response to the impact of rain drops.

8. The rain sensor as set forth in claim 6, wherein said stopper means is separated from the lower surface of said vibrator by a given distance, thereby defining an allowable maximum amplitude of vibrator vibration.

9. The rain sensor as set forth in claim 8, wherein said stopper means extends from a portion of said sensor housing adjacent said vibrator.

10. The rain sensor as set forth in claim 8, wherein said sensor housing includes a base for supporting a sensor circuit, said base having an extended portion extending towards said vibrator, the upper end of said extended portion opposing said vibrator at a given distance from said vibrator.

11. The rain sensor as set forth in claim 5, which further comprises a stopper means provided opposite said vibrator for restricting the vibrational movement of said vibrator to within a given range.

12. The rain sensor as set forth in claim 11, wherein said sensor housing includes a base for supporting a sensor circuit, said base having an extended portion extending towards said vibrator, the upper end of said portion opposing said vibrator at a given distance from said vibrator so as to define said given vibration range.

13. The rain sensor as set forth in claim 1, wherein said sensor housing comprises an upper cover and a lower base which has a circumferential edge engageable with the inner periphery of said upper cover in waterproof fashion.

14. The rain sensor as set forth in claim 13, wherein said lower base comprises first and second base members fixed together along mating surfaces, said first and second base members defining a space extending along their common circumference which is filled with a sealer to establish a watertight seal between said upper cover and said lower base.

15. The rain sensor as set forth in claim 14, wherein said resilient member is made of rubber and extends to the circumferential edge of said lower base for engagement therewith in waterproof fashion.

16. The rain sensor as set forth in claim 5, wherein said sensor housing comprises an upper cover and a lower base having a circumferential edge engageable with said upper cover in waterproof fashion.

17. The rain sensor as set forth in claim 16, wherein said lower base comprises a first and a second base member fixed together along mating surfaces, said first and second base members defining a space within the inner periphery of said upper cover, which space is filled with a sealer to establish a watertight seal between said upper cover and said lower base.

18. The rain sensor as set forth in claim 1, which further comprises a resilient seat fixed to a portion of an automotive vehicle body and resiliently holding said sensor housing thereon.

19. The rain sensor as set forth in claim 17, which further comprises a resilient seat fixed to a portion of an automotive vehicle body and resiliently holding said sensor housing thereon.

20. The rain sensor as set forth in claim 19, which is connected to an automotive wiper drive circuit for controlling operation of a wiper according to the detected rain conditions.

21. The rain sensor as set forth in claim 20, wherein said wiper drive circuit adjusts the interval of intermittent operation of the wiper depending upon the detected rain conditions.

22. A rain sensor for an automotive wiper control system, comprising:

an essentially hollow sensor casing adapted to be fixed to a vehicle body at a position at which rain falls in approximately the same manner as it does at the front windshield;

a vibrator plate suspended for independent vibration within said sensor casing and having a sensor surface exposed to the atmosphere for receiving rain drops thereon, said vibrator plate vibrating at an amplitude and frequency corresponding to the energy applied to the sensor surface by the impact of rain drops;

a vibration sensitive element associated with said vibrator plate for vibration therwith, said vibration sensitive element producing an electrical signal representative of the vibration of said vibrator plate;

a resilient suspension member fixed to said sensor casing and said vibrator plate for resiliently supporting said vibrator plate with said vibration sensitive element while allowing vibration thereof in response to the impact of rain drops; and a sensor circuit housed within said sensor casing and adapted to output a rain condition indicative signal which varies in accordance with the signal produced by said vibration sensitive element.

23. The rain sensor as set forth in claim 22, wherein said resilient suspension member is adapted to allow vibration of said vibrator plate in response to the impact of rain drops and simultaneously to absorb vibrations transmitted through the vehicle body.

24. The rain sensor as set forth in claim 23, wherein said resilient suspension member is flexible enough to allow the vibrator plate to vibrate with a sufficiently high amplitude for detecting rain conditions.

25. The rain sensor as set forth in claim 24, wherein said sensor circuit includes an amplifier for amplifying the signal from said vibration sensitive element to a level applicable to said automotive wiper control system.

26. The rain sensor as set forth in claim 24, wherein said resilient suspension member is formed with a groove extending along the circumferential edge of said vibrator plate so as to enhance the flexibility of said resilient suspension member.

27. The rain sensor as set forth in claim 22, wherein said sensor casing is watertight.

28. The rain sensor as set forth in claim 27, which further comprises a resilient seat disposed between said sensor casing and said vehicle body for attaching said sensor casing to said vehicle body in a waterproof fashion.

29. The rain sensor as set forth in claim 27, wherein said casing comprises an upper cover and a lower base which is engageable with the former by means of a resilient seal for establishing watertight engagement therebetween.

30. The rain sensor as set forth in claim 22, which further comprises a stopper opposing said vibrator plate for restricting the vibrational motion of the latter to within a given range.

31. The rain sensor as set forth in claim 30, wherein said stopper comprises a resilient support extending upwards from the bottom of said sensor casing.

32. The rain sensor as set forth in claim 31, wherein the top of said stopper contacts the lower surface of said vibrator plate and is adapted to resiliently deform to allow limitted vibration of said vibrator plate.

33. The rain sensor as set forth in claim 29, wherein said stopper comprises a plurality of radially extending strips extending from the edge of said upper cover towards the center of said vibrator plate, said strips being separated vertically from the lower surface of said vibrator plate by a given distance.

34. The rain sensor as set forth in claim 29, wherein said stopper means comprises a portion of said lower base bent upwardly so as to position the top thereof at a given distance below the lower surface of said vibrator plate.

35. A rain sensor for an automotive wiper control system, comprising:
 a vibrator assembly exposed at least in part to rain, said vibrator assembly vibrating in accordance with the conditions of raindrop impact on its exposed surface or surfaces and generating a vibration signal representative of the conditions of its vibration;
 a sensor housing attached to an automotive vehicle;
 electrical circuitry disposed within said housing for converting said vibration signal to a rain condition signal indicative of rain conditions at the exposed surface or surfaces of said vibrator assembly and outputting the rain condition signal to the automotive wiper control system;
 a resilient member for attaching said vibrator assembly to said housing while allowing the former to vibrate freely with respect to the latter and waterproofing the housing in order to protect the electrical circuitry from the rain impinging on the exposed surface or surfaces of said vibrator assembly.

36. The rain sensor of claim 35, further comprising means for limiting the vibrational movement of said vibrator assembly to within a predetermined range.

37. The rain sensor of claim 35, wherein the sensor housing is freely attachable to and detachable from a fixture in the body of the automotive vehicle.

38. The rain sensor of claim 35, wherein at least one exposed surface of said vibrator assembly is canted so as to be approximately parallel to at least a portion of the front windshield of the automotive vehicle.

* * * * *